United States Patent
Pradas et al.

(10) Patent No.: US 10,674,475 B2
(45) Date of Patent: Jun. 2, 2020

(54) RADIO NETWORK NODE, CORE NETWORK NODE AND METHODS PERFORMED THEREIN

(71) Applicant: Telefonaktiebolaget LM Ericsson (publ), Stockholm (SE)

(72) Inventors: Jose Luis Pradas, Stockholm (SE); Håkan Axelsson, Linköping (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 652 days.

(21) Appl. No.: 15/100,570

(22) PCT Filed: Apr. 22, 2016

(86) PCT No.: PCT/SE2016/050358
§ 371 (c)(1),
(2) Date: May 31, 2016

(87) PCT Pub. No.: WO2017/184048
PCT Pub. Date: Oct. 26, 2017

(65) Prior Publication Data
US 2018/0084524 A1    Mar. 22, 2018

(51) Int. Cl.
*H04W 68/02*    (2009.01)
*H04W 76/28*    (2018.01)
(Continued)

(52) U.S. Cl.
CPC ......... *H04W 68/02* (2013.01); *H04W 76/28* (2018.02); *H04W 36/22* (2013.01); *H04W 76/27* (2018.02)

(58) Field of Classification Search
CPC ... H04W 68/005; H04W 68/02; H04W 36/22; H04W 36/0022
(Continued)

(56) References Cited

U.S. PATENT DOCUMENTS

| 2011/0237218 A1* | 9/2011 | Aoyama | H04H 20/59 455/404.1 |
| 2014/0321371 A1* | 10/2014 | Anderson | H04W 76/38 370/329 |
| 2014/0329550 A1* | 11/2014 | Diachina | H04W 68/02 455/458 |

FOREIGN PATENT DOCUMENTS

| GB | 2513181 A | 10/2014 |
| WO | 2011023090 A1 | 3/2011 |

(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.1.0, Sep. 2015, 1-254.

(Continued)

*Primary Examiner* — Margaret G Mastrodonato
(74) *Attorney, Agent, or Firm* — Sage Patent Group

(57) ABSTRACT

Embodiments herein relate to a method performed by a radio network node (12) for handling communication of data to a wireless device (10) in a wireless communication network (1). The radio network node triggers a paging procedure of the wireless device from a core network node (13) in the wireless communication network (1) by transmitting, to the core network node (13), an initiating indication indicating an initiation of paging from the core network node (13) when a criterion is fulfilled.

20 Claims, 13 Drawing Sheets

(51) Int. Cl.
*H04W 76/27* (2018.01)
*H04W 36/22* (2009.01)

(58) Field of Classification Search
USPC .................................................. 455/458, 436
See application file for complete search history.

(56) References Cited

FOREIGN PATENT DOCUMENTS

| WO | 2014090294 A1 | 6/2014 | |
|---|---|---|---|
| WO | WO-2014090294 A1 * | 6/2014 | ............ H04W 68/00 |
| WO | 2014188268 A2 | 11/2014 | |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.4.0, Mar. 2015, 1-38.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, 1-334.

* cited by examiner

RADIO NETWORK NODE, CORE NETWORK NODE AND METHODS PERFORMED THEREIN

TECHNICAL FIELD

Embodiments herein relate to a radio network node, a core network node and methods performed therein for communication. Furthermore, a computer program and a computer readable storage medium are also provided herein. In particular, embodiments herein relate to handling communication for a wireless device in a communication network.

BACKGROUND

In a typical communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (P-GW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are S1 Application Protocol (S1-AP) and Stream Control Transmission Protocol (SCTP). S1AP is the application layer protocol between the radio network node and the MME and SCTP for example guarantees delivery of signaling messages between MME and the radio network node. The transport network layer is based on Internet Protocol (IP).

Establishment of the S1-MME interface on S1AP protocol level is shown in FIG. 3 as the S1 setup procedure. The purpose of the S1 Setup procedure is to exchange application level data needed for the radio network node and the MME to correctly interoperate on the S1 interface. The radio network node may initiate the procedure by sending an S1 SETUP REQUEST message to the MME once it has gained IP connectivity and it has been configured with at least one Tracking Area Indicator (TAI). The TAI(s) are used by the radio network node to locate IP-addresses of the different MMEs, possibly in different MME pools. The radio network node includes its global radio network node identity and other information in the S1 SETUP REQUEST message. The MME responds with an S1 SETUP RESPONSE message. This S1 SETUP RESPONSE message includes for example the Globally Unique MME identifier(s) (GUMMEI) of the MME.

An Initial Context Setup process is shown in FIG. 4. An INITIAL CONTEXT SETUP REQUEST message is sent by the MME to request the setup of a wireless device context or context of a wireless device. This INITIAL CONTEXT SETUP REQUEST message comprises information related to both the wireless device context and different E-RABs to be established. For each E-RAB the MME includes E-RAB Quality of Service (QoS) parameters such as QoS Class Identifier (QCI) and Allocation and Retention Priority (ARP). The QCI is a scalar that is used as a reference to radio access node-specific parameters that control bearer level packet forwarding treatment, e.g. scheduling weights, admission thresholds, queue management thresholds, link layer protocol configuration, etc., and that have been preconfigured by the operator owning the radio network node. An INITIAL CONTEXT SETUP RESPONSE message is sent by eNB to the MME confirming the setup. Current assumption is that the RAN-CN split is similar for 5G as for 4G, implying an (evolved) S1 interface.

In LTE a Discontinuous Reception (DRX) cycle is used to enable the wireless device to save its battery. The DRX cycle is used in Radio Resource Control (RRC) idle mode but it can also be used in RRC connected mode. Examples of DRX cycles or lengths of DRX cycles currently used in RRC idle mode are 320 ms, 640 ms, 1.28 s and 2.56 s. Examples of lengths of DRX cycles currently used in RRC connected mode may range from 2 ms to 2.56 s.

The DRX cycle is configured by a network node such as a radio network node or a core network node and the DRX cycle consists of an "on period" part and a "sleep period". During the "on period", the wireless device monitors a set of the DL channels. The set of DL channels depends on the RRC mode in which the wireless device is i.e. Connected Mode or Idle Mode. In these "on periods", the wireless device also performs measurements, e.g. intra/inter frequencies, inter-Radio Access Technology (RAT), etc, by e.g. in LTE monitoring the Primary Synchronization Signal (PSS)/Secondary Synchronization Signal (SSS) and Cell specific Reference signals (C-RS). This on period is denoted as On duration. During the on duration of the DRX cycle, a timer called 'onDurationTimer', which is configured by the network node, is running. This timer specifies a number of consecutive control channel subframes, e.g. Physical Downlink Control Channel (PDCCH), enhanced Physical Downlink Control Channel (ePDCCH) subframe(s), at the beginning of a DRX Cycle. It is also interchangeably called as DRX ON period. More specifically it is the duration in downlink subframes that the wireless device after waking up from DRX to receive control channel, e.g. PDCCH or ePDCCH. If the wireless device successfully decodes the control channel, e.g. PDCCH or ePDCCH, during the ON duration then the wireless device starts a drx-inactivity timer and stays awake until its expiry. When the onDurationTimer is running the wireless device is considered to be in a DRX mode of the DRX cycle.

The drx-inactivity timer specifies the number of consecutive control channel, e.g. PDCCH or ePDCCH, subframe(s) after the subframe in which a control channel, e.g. PDCCH, indicates an initial UL or DL user data transmission for this Medium Access Control (MAC) entity. It is also configured by the network node. When the drx-inactivity timer is running the wireless device is considered to be in a non-DRX mode i.e. no DRX is used. An active time is the time the duration during which the wireless device monitors the control channel, e.g. PDCCH or ePDCCH. In other words this is the total duration during which the wireless device is awake. This includes the "on-duration" of the DRX cycle, the time during which the wireless device is performing continuous reception while the drx-inactivity timer has not expired and the time the wireless device is performing continuous reception while waiting for a DL retransmission after one Hybrid Automatic Repeat Request Round-Trip Time (HARQ RTT). The minimum active time is equal to the length of an on duration, and the maximum active time is undefined (infinite). Thus, if the wireless device receives a DL message during the "on" duration, the wireless device exits its DRX cycle, starts a "DRX inactivity timer", and continuously monitors the corresponding DL channels until the timer expires.

During the "sleep period", the wireless device is not mandated to monitor the DL channels and, therefore, the wireless device cannot be reached for DL transmissions during this time.

The DRX ON and DRX OFF durations of the DRX cycle are shown in FIG. 5. The DRX operation with more detailed parameters in LTE is illustrated in FIG. 6.

Hence, in LTE, DRX functionality can be configured for both RRC_IDLE and RRC_CONNECTED wireless devices. The wireless device restarts the DRX Inactivity Timer each time the wireless device gets DL data and, when the timer expires the wireless device starts its DRX cycle again. In Connected Mode, the wireless device starts a short DRX cycle, if configured. Otherwise, the wireless device starts a long DRX cycle. If the wireless device does not receive any DL message during the "DRX short cycle timer" period, the wireless device enters the second, long, DRX cycle.

In Idle Mode, there is only one DRX cycle. The DRX cycle is also known as "Paging Cycle". When using DRX in RRC_IDLE mode in LTE, during the "on period", the wireless device monitors the DL for paging messages intended for the wireless device. The paging cycles and paging occasion which are applicable for a wireless device may be configured in system information or may be provided via dedicated signaling by the network. In LTE, paging is triggered by the core network (CN), and the paging cycles correspond to the core network configuration.

In 3G each CN domain can have its own paging cycle either wireless device specific or default. In order to make the wireless device only wake up once to receive paging from Circuit Switched (CS) CN or from Packet Switched (PS) CN or from both the paging cycles are multiple of each others and Paging Occasion (PO) is based on International Mobile Subscriber Identity (IMSI) of the wireless device in both cases.

In LTE Idle Mode, the paging cycles configure the paging frames and occasions when a wireless device may expect a paging indication. This also means that the wireless device may sleep at other times.

The paging frames may be calculated using the following formula from 3GPP TS 36.304 v12.4.0:

$$SFN \bmod T = (T \text{ div } N)*(UE\_ID \bmod N)$$

Where T is the assigned DRX_cycle, and DRX_cycle is the DRX cycle, or paging cycle, configured for the Wireless device in Idle Mode. And UE_ID is the IMSI of the wireless device. The wireless device monitors the same occasions also in connected mode but only for system information update notifications.

$$N = \min(T, nB), nB = \{4T, 2T, T, T/2, T/4 \ldots\}$$

DRX cycle=Paging cycle

Within the paging frame, there is a concrete paging occasion, subframe (i_s), which the wireless device monitors.

$$i\_s = \text{floor}(UE\_ID/N) \bmod Ns$$

DRX parameters of System Information (SI) stored in the wireless device shall be updated locally in the wireless device whenever the DRX parameter values are changed in the SI. If the wireless device has no IMSI, for instance when making an emergency call without Universal Subscriber Identity Module (USIM), the wireless device shall use as default identity UE_ID=0 in the Paging Frames (PF) and i_s formulas above.

The following Parameters are used for the calculation of the PF and i_s:

T: DRX cycle of the wireless device. T is determined by the shortest of the wireless device specific DRX value, if allocated by upper layers, and a default DRX value broadcast in system information. If wireless device specific DRX is not configured by upper layers, the default value is applied.

nB: 4T, 2T, T, T/2, T/4, T/8, T/16, T/32.

N: min(T,nB)

Ns: max(1,nB/T)

UE_ID: IMSI mod 1024.

IMSI is given as sequence of digits of type Integer (0 . . . 9), IMSI shall in the formulae above be interpreted as a decimal integer number, where the first digit given in the sequence represents the highest order digit.

For example:

IMSI=12(digit1=1,digit2=2)

In the calculations, this shall be interpreted as the decimal integer "12", not 30 "1×16+2=18".

Ns: max(1,nB/T)

nB is a parameter which is directly mapped the number of resources the network wants to allocate for paging purposes. For example, if the configured DRX cycle is 64 radio frames and nB is set to T or lower, the network may only send paging indications once every 64 radio frames. Therefore, all the wireless devices will wake up at the same SFN. If the nB is set to 2T, the network may send paging indications at two different times within the 64 radio frames.

There may be several paging frames within a DRX cycle. In each of the paging frames, there may be one or more paging occasions, one or more sub-frames within a paging frame. Wireless devices are grouped and distributed among the resources dedicated for paging.

A system frame is equivalent in LTE to 10 ms.

There may be cases in which the radio network node may not be able to locate the wireless device. This could happen, for example, in error cases when the wireless device moves to Idle Mode autonomously. In this case, the radio network node may not be aware that the wireless device has moved to this mode and the wireless device may not be monitoring any longer the paging occasions configured by the radio network node, and the wireless device may be following the CN paging cycles. Another case is when RAN's paging area is smaller than the wireless device's mobility area, the area which the wireless device can move within without updating the network. This may result in that the radio network node may not be able to locate the wireless device by a radio network node paging procedure reducing or limiting the performance of the communication network.

SUMMARY

An object of embodiments herein is to provide a mechanism for improving performance of the wireless communication network in an efficient manner.

According to an aspect the object is achieved by a method performed by a radio network node for handling communication of data to a wireless device in a wireless communication network. The radio network node triggers a paging procedure of the wireless device from a core network node in the wireless communication network by transmitting, to the core network node, an initiating indication indicating an initiation of paging from the core network node when a criterion is fulfilled.

According to another aspect the object is achieved by a method performed by a core network node for handling communication of data to a wireless device in a wireless communication network. The core network node triggers a paging of the wireless device in the wireless communication network when receiving, from a radio network node, an initiating indication indicating an initiation of the paging from the core network node for the wireless device. The core network node further initiates the paging of the wireless device over one or more other radio network nodes.

According to yet another aspect the object is achieved by providing a radio network node for handling communication of data to a wireless device in a wireless communication network. The radio network node is configured to trigger a paging procedure of the wireless device from a core network node in the wireless communication network by being configured to transmit, to the core network node, an initiating indication indicating an initiation of paging from the core network node when a criterion is fulfilled.

According to still another aspect the object is achieved by providing a core network node for handling communication of data to a wireless device in a wireless communication network. The core network node is configured to trigger paging of the wireless device in the wireless communication network when receiving, from a radio network node, an initiating indication indicating an initiation of the paging from the core network node for the wireless device. The core network node is further configured to initiate the paging of the wireless device over one or more other radio network nodes.

By requesting the paging to be performed by the core network node upon fulfillment of a criterion, e.g. when paging locally is not successful or for communication of critical information, an increase of successful paging is achieved. Thus, embodiments herein enable transmission of data to the wireless device in an efficient manner leading to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
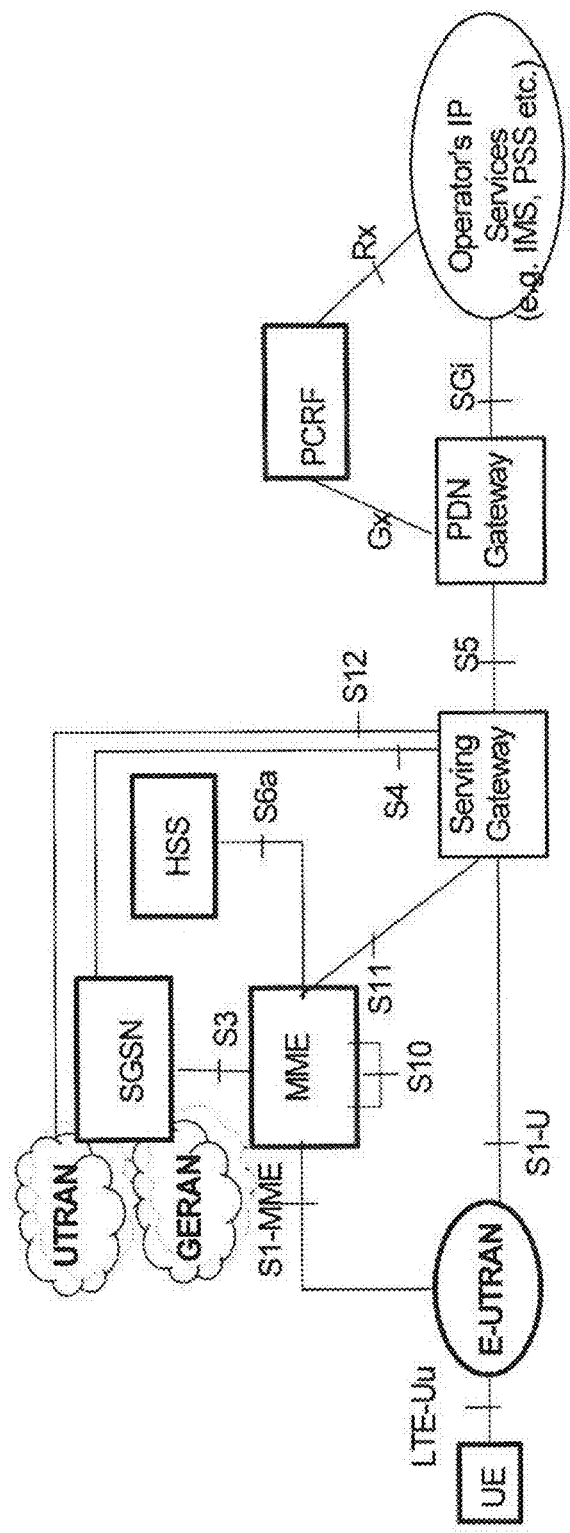
FIG. 1 is a schematic overview depicting a wireless communication network according to prior art.
Figure 2:
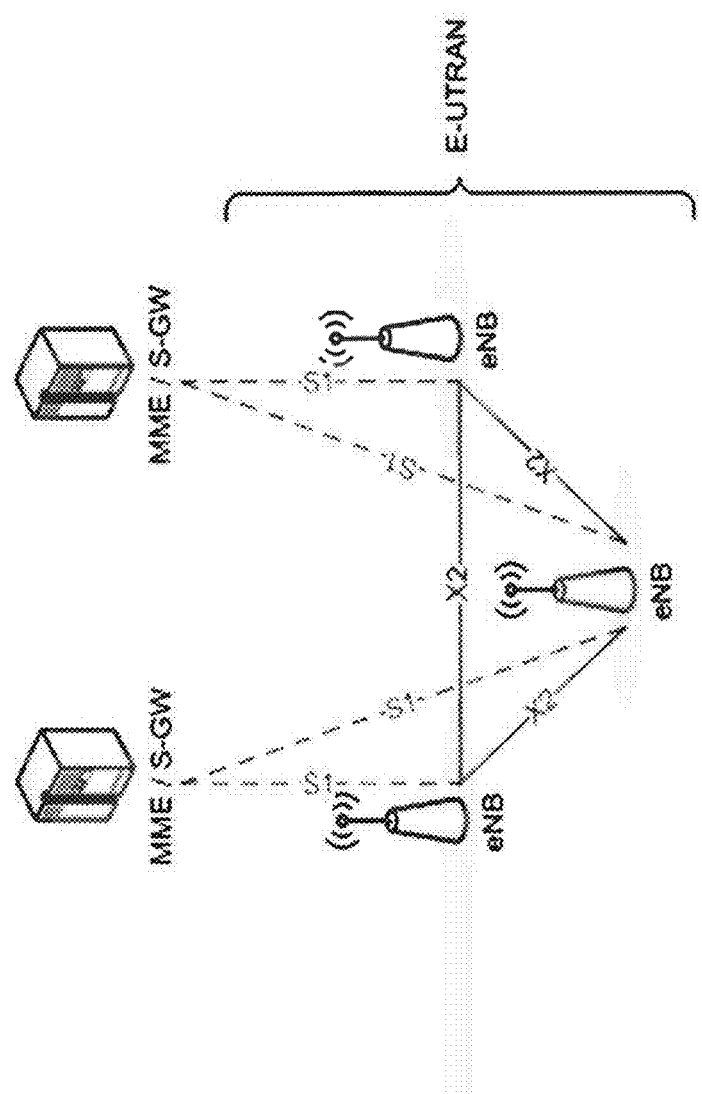
FIG. 2 is a schematic overview depicting a radio access network in connection with a core network.
Figure 3:
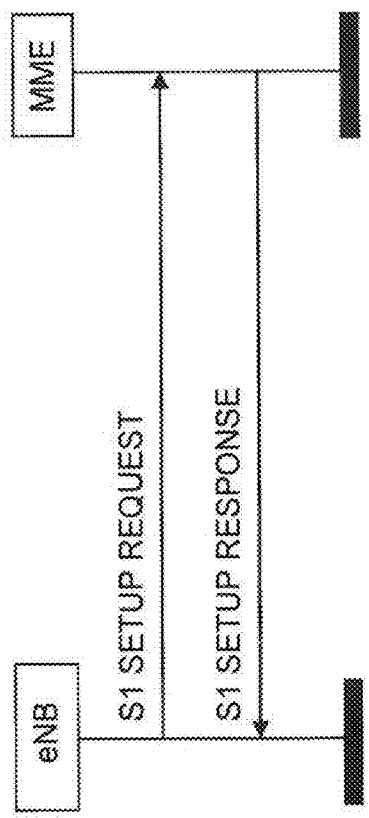
FIG. 3 is a signalling scheme according to prior art.
Figure 4:
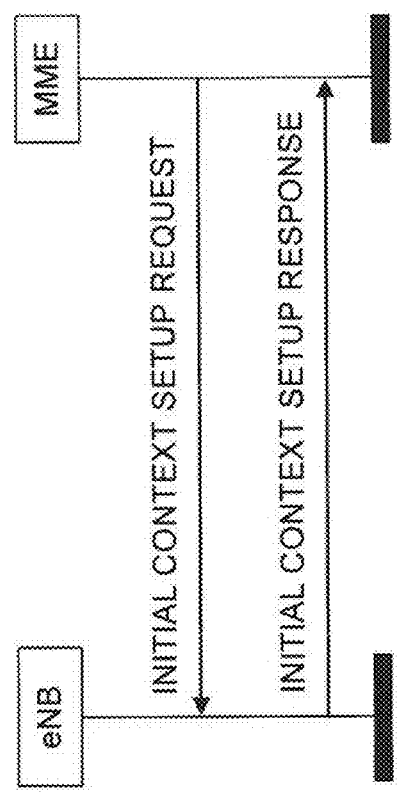
FIG. 4 is a signalling scheme according to prior art.
Figure 5:
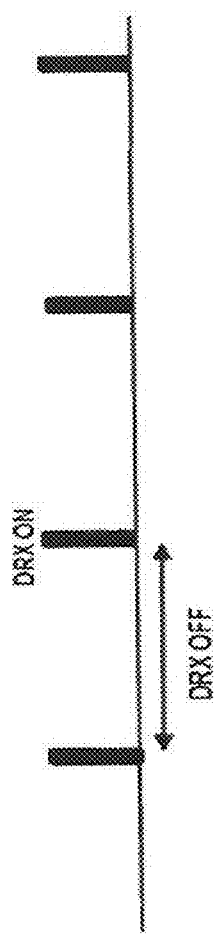
FIG. 5 is a DRX procedure with DRC cycle according to prior art.
Figure 6:
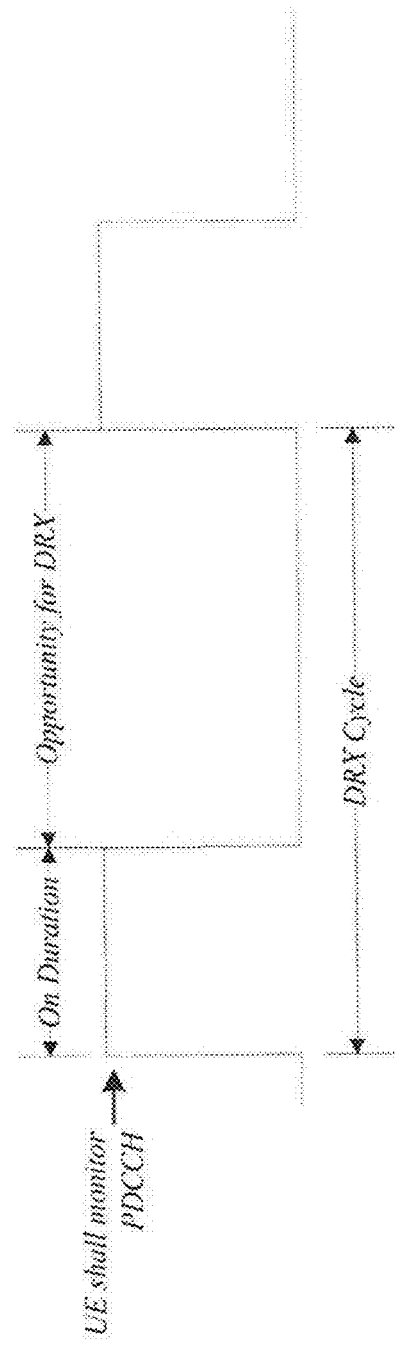
FIG. 6 is a DRX procedure with DRC cycle according to prior art.
Figure 7:
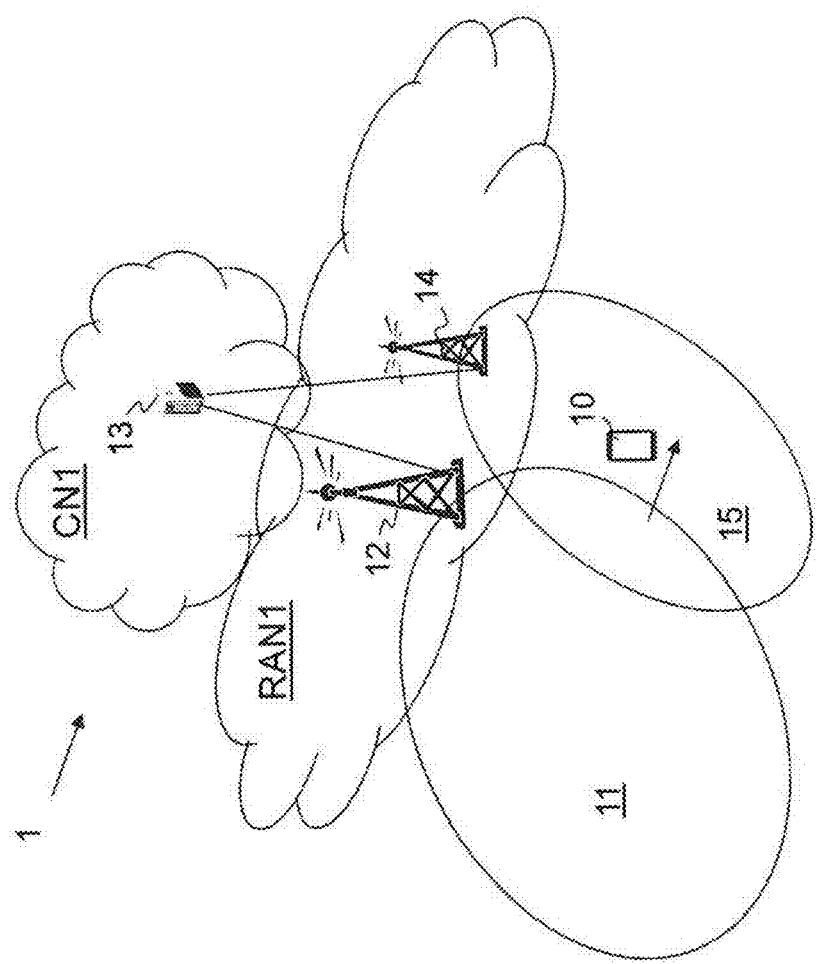
FIG. 7 is a schematic overview depicting a wireless communication network according to embodiments herein.

Embodiments herein relate to communication networks in general. FIG. 7 is a schematic overview depicting a wireless communication network 1. The wireless communication network 1 comprises one or more RANs e.g. a first RAN (RAN1), connected to one or more CNs, exemplified as a first CN (CN1). The wireless communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a wireless device 10 such as a mobile station, a non-access point (non-AP) STA, a STA, a user equipment and/or a wireless terminal, are connected via the one or more RANs, to the CN. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or any device communicating within a cell or service area.

The wireless communication network 1 comprises a first radio network node 12 providing radio coverage over a geographical area, a first service area 11, of a first radio access technology (RAT), such as LTE, UMTS. Wi-Fi or similar. The first radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the first radio network node 12 depending e.g. on the first radio access technology and terminology used.

The wireless communication network 1 further comprises a core network node 13, e.g. an MME, of the CN1, for e.g. controlling the radio network nodes in the RAN1 or similarly.

Furthermore, the wireless communication network 1 comprises a second radio network node 14 providing radio coverage over a geographical area, a second cell or a second service area 15, of a second radio access technology (RAT), such as LTE, UMTS, Wi-Fi or similar. The second radio network node 14 has its own radio resource management (RRM) for the second service area 15. The second radio network node 14 may be a radio access network node such as radio network controller or an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the second radio network node 14 depending e.g. on the second radio access technology and terminology used. The second radio network node 14 is comprised in the same or different RAN as the first radio network node 12 and the first and second RAT may be the same or different RATs.

It should be noted that a service area may the denoted as 'cell', beam, beam group or similar to define an area of radio coverage.

The first radio network node 12 is connected to the second radio network node 14 over e.g. an X2 connection/s, S1 connection/s or a combination thereof or similar.

The wireless device 10 may be in one of the different RRC modes, e.g. Idle Mode, or Connected Mode. Within the Connected Mode, for e.g. 5G, the wireless device 10 may be in two different modes: Active, and Dormant, see below in reference to FIG. 8. The Dormant mode is a hybrid mode/state between Connected Mode and Idle Mode, while the Active mode may be very similar to what RRC Connected Mode is in LTE.

The first radio network node 12 and/or the core network node 13 may configure the wireless device 10 with different paging cycles, or DRX cycles. The concrete paging cycle may depend on a set of conditions such as the type of wireless device, traffic pattern of the wireless device, RRC Mode or State, among others. The first radio network node 12 and/or the core network node 13 may provide different configurations for the paging cycle at the different modes, e.g. Idle Mode and Connected Mode, and different configurations for the paging cycle at the different modes in Connected Mode, i.e. Active and Dormant mode. Depending on the mode, also referred to as state, the paging procedure responsibility lays on the first radio network node 12 or at the Core Network node 13. In the case of Idle Mode, the Core Network node 13 holds the paging responsibility. On the other hand, in the case of Connected Mode, the first radio network node 12 holds the paging responsibility.

According to embodiments herein the paging responsibility is divided between two different nodes, i.e. the first radio network node 12 and the core network node 13, in the wireless communication network 1, and a coordination between the first radio network node 12 and the core network node 13 for paging the wireless device is herein provided. This coordination is needed since it cannot be ensured that the first radio network node 12 or the core network node 13 always knows which mode the wireless device 10 is in and, therefore, the different options of paging the wireless device 10 are used to locate the wireless device 10.

Figure 8:
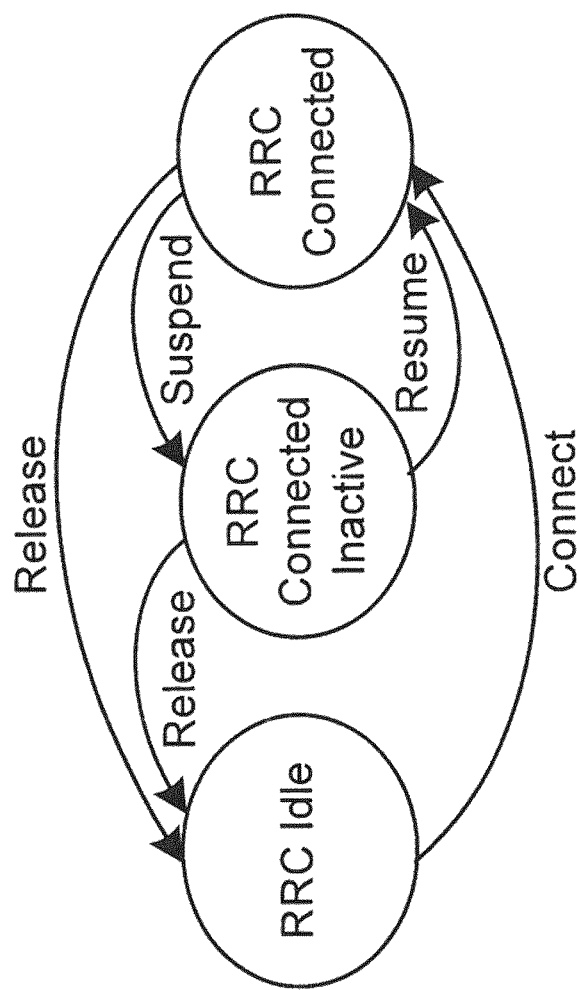
FIG. 8 is an overview depicting modes of a wireless device.

According to embodiments herein the wireless device 10 may e.g. move during an Idle Mode (RRC Idle in FIG. 8) or a dormant/inactive mode in Connected Mode, also referred to as dormant mode or "RRC Connected Inactive", see FIG. 8 below. Thus, the wireless device 10 is not in an "Active" mode in Connected Mode, also referred to as RRC_Connected mode, when moving to the second service area 15.

The first radio network node 12 or the core network node 13 may receive data intended for the wireless device 10, and the first radio network node 12 may then try and page the wireless device 10. When not receiving a response message from the wireless device 10, the first radio network node 12 may trigger a paging procedure of the wireless device 10 from the core network node 13 in the wireless communication network 1. The first radio network node 12 may trigger the paging procedure by transmitting, to the core network node 13, an initiating indication indicating an initiation of paging from the core network node 13. E.g. the first radio network node 12 may transmit a request message to the core network node 13 indicating a request for paging the wireless device 10. The core network node 13 receiving the initiating indication then triggers the paging of the wireless device 10 in the wireless communication network and initiates the paging of the wireless device 10 over e.g. the second radio network node 14. The core network node 13 may page the wireless device 10 either according to a core network paging configuration stored at the core network node 13, a paging configuration according to setup at the first radio network node 12, or both. Paging configuration may e.g. be when to page and using what identity of the wireless device 10. Thereby, if the wireless device 10 has moved to the second service area 15, the core network node 13 will locate the wireless device 10 when responding either to the paging according to the core network paging configuration or the paging according to the paging configuration from the first radio network node 13. Hence, the wireless device 10 will respond independently if the wireless device 10 is in an idle mode or a dormant mode, see FIG. 8.

It should also be noted that embodiments herein are also applicable when the first radio network node 12 has data for the wireless device 10 that is important to receive, have a higher priority than other data. In order to rapidly locate the wireless device 10 the radio network node 12 may request the core network node 13 to initiate the paging of the wireless device 10. Thus, the triggering of this process to let the core network node 13 initiate the paging procedure is when the first radio network node 12 has data of critical information intended for the wireless device 10. E.g. the first radio network node 12 may support a certain type of service, which may be considered more critical or have a higher priority than other services. For instance, Earthquake and Tsunami Warning System (ETWS), critical services e.g. alarms, or data with needs of a latency as low as possible.

RRC, which is terminated in the radio network node on the network side from a wireless device, performs one or more functions like: Broadcast, Paging, RRC connection management, Resource Block (RB) control, Mobility functions, Wireless device measurement reporting and control or the like.

The RRC modes in previous communication networks are RRC_IDLE and RRC_CONNECTED. The wireless device 10 is in the RRC_CONNECTED mode when an RRC connection has been established e.g. between the wireless device 10 and the first radio network node 12. If this is not the case, i.e. no RRC connection is established, the wireless device is in the RRC_IDLE mode.

EPS Mobility Management (EMM) modes describe the Mobility Management modes that result from the mobility management procedures e.g. Attach and Tracking Area Update procedures. Two major EMM modes are EMM-DEREGISTERED and EMM-REGISTERED.

EPS Connection Management (ECM) modes describe the signaling connectivity between the wireless device and the network e.g. EPC, which includes both RRC connection between the wireless device and radio network node and S1 connection, i.e. S1AP association, between the radio network node and the core network node. Two major ECM modes are ECM-IDLE and ECM-CONNECTED.

In general, the ECM and EMM modes are independent of each other. Transition from EMM-REGISTERED to EMM-DEREGISTERED can occur regardless of the ECM mode, e.g. by explicit detach signaling in ECM-CONNECTED or by implicit detach locally in the MME during ECM-IDLE. However there are some relations, e.g. to transition from EMM-DEREGISTERED to EMM-REGISTERED the wireless device has to be in the ECM-CONNECTED mode.

In 5G, it is foreseen to two modes "Active" and "Dormant", within the RRC Connected Mode. The Dormant mode is as stated above a hybrid mode between Connected Mode and Idle Mode, while the Active Mode may be very similar to what RRC Connected Mode is in LTE. FIG. 8 is illustrating one likely model to be adopted. The model consists of three modes: "RRC Idle", "RRC Connected" and "RRC Connected Inactive" also referred to as Dormant mode. In the novel model the mode transitions from RRC Idle to RRC Connected are expected to occur mainly during the first initial access, e.g. when the wireless device 10 attaches to the network, or as a fallback case, e.g. when the wireless devices 10 and/or network cannot use the previously stored RAN context. As a consequence, this transition is not expected to occur as often as in LTE. On the other hand, transitions from "RRC Connected Inactive" to "RRC Connected" are expected to occur quite often and should be optimized as a lightweight and fast transition. The novel "RRC Connected Inactive" mode designed to be used as the primary sleep mode for the 5G access has as one of the characteristics the maintenance of context information by the wireless device and the network when the wireless device moves from "RRC Connected" to "RRC Connected Inactive" may also be called a Suspended mode.

Dormant mode is not only meant to be very power efficient but also should allow very quick transitions to "Active". In this mode, the wireless device 10 may move within a certain area without informing the network.

In Dormant mode, the S1 connection, i.e. the connection between the core network node 13 and the first radio network node 12, is maintained. Therefore, when data is to be transmitted to the network, the data may be sent by the core network node 13 to the first radio network node 12 in which the S1 is terminated. This may imply that the functionality to locate the wireless device 10 is placed at the radio network nodes since, from a core network perspective, the wireless device 10 is in a connected mode. For this purpose, the network may create Tracking RAN areas (TRA). A wireless device is known by the RAN within one or more TRAs, and a certain set of configurations such as, for instance, DRX and paging cycles may be maintained within one or more TRAs, as configured by the network.

Figure 9:
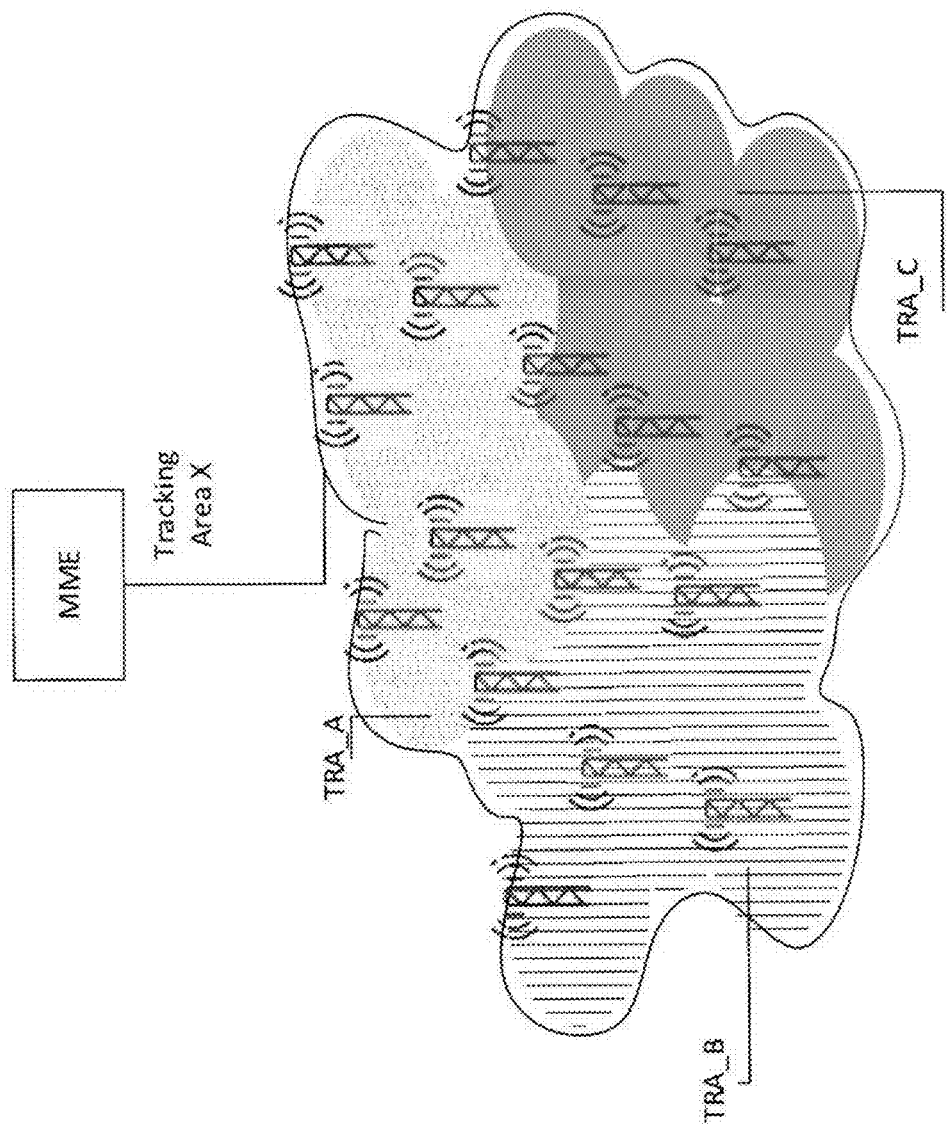
FIG. 9 is an overview depicting Tracking RAN areas in a wireless communication network.

On top of that, there may still be Tracking Areas (TA) as known today in LTE. These areas are configured by the core network. The wireless device 10 is known by the CN within one or more TAs. TRAs and TA may be identical, partly overlap, or TRAs may be a subset of the TAs, see FIG. 9.

There may be cases in which the wireless device 10 has moved and is in a different node within the TRA in which the wireless device 10 is allowed to move without informing the network. Then, the RAN has to find the wireless device 10 to be able to deliver the data. For wireless devices in "Idle Mode" in 5G, the core network node 13 may still be the entity responsible for triggering the paging.

Figure 10:
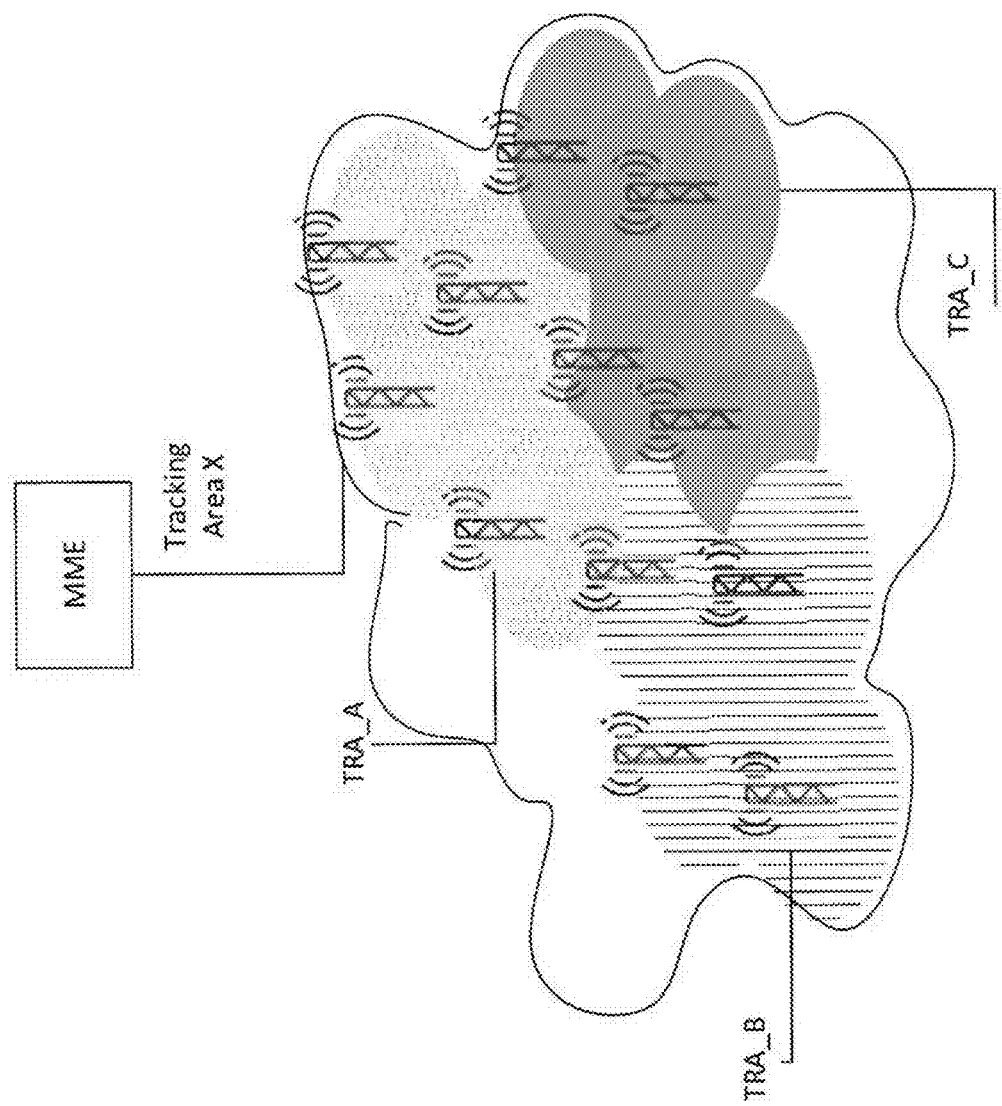
FIG. 10 is an overview depicting Tracking RAN areas and Tracking Areas in a wireless communication network.

Another case is when RAN's paging area is smaller than the wireless device's mobility area, see FIG. 10, the area which the wireless device 10 can move within without updating the network being in e.g. the Dormant mode.

Figure 11:
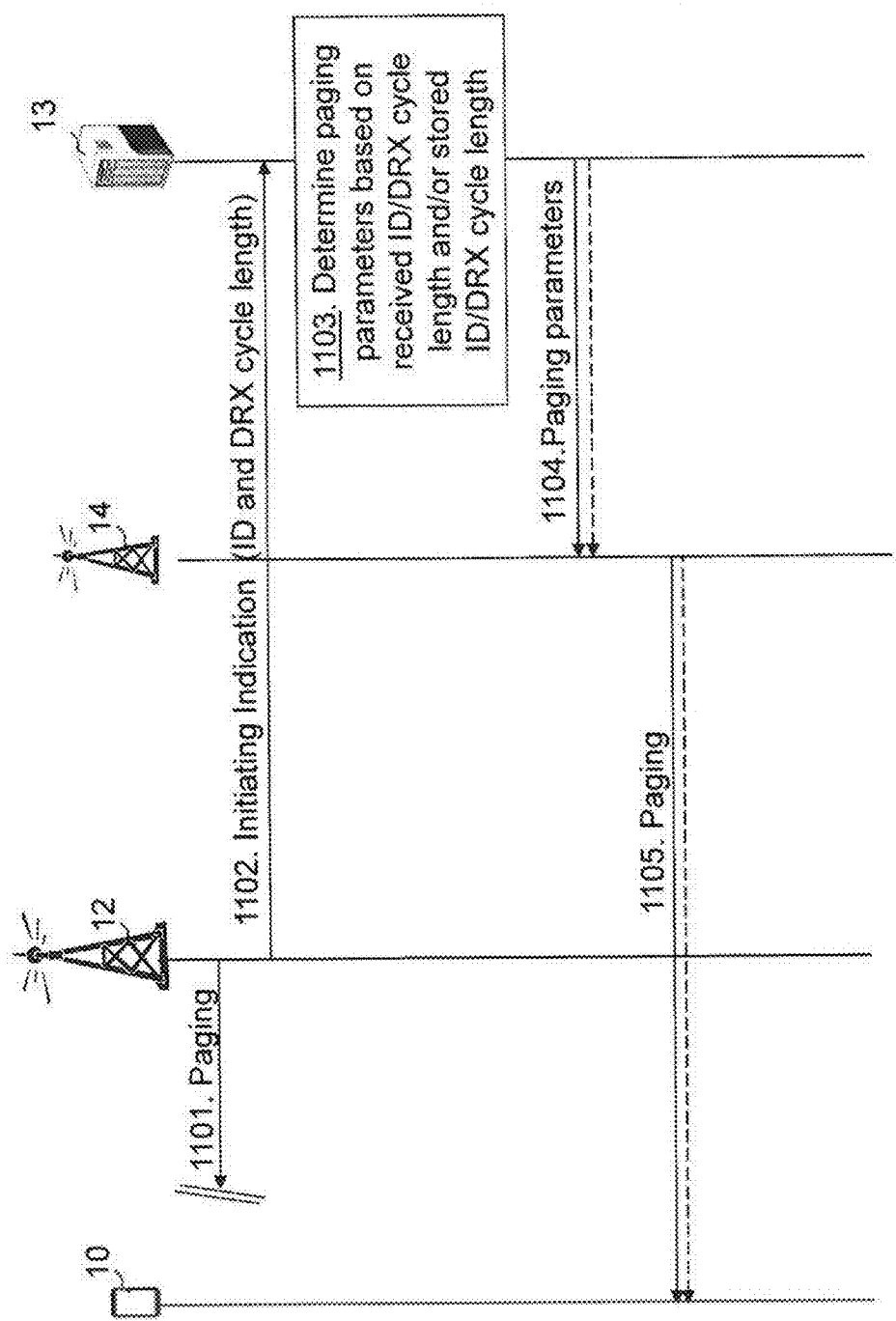
FIG. 11 is a combined flowchart and signalling scheme according to embodiments herein.

FIG. 11 is a combined flowchart and signalling scheme according to some embodiments herein.

Action 1101. The first radio network node 12 initiates a paging procedure of the wireless device 10. This may be initiated in receiving a paging indication from the core network node 13 indicating that a paging procedure of the wireless device 10 is requested. The wireless device 10 may previously be RRC connected to the first radio network node 12 and configured with a first PO by the first radio network node 12. The first PO, i.e. when to page the wireless device 10, is defined by a wireless device identity index value of the wireless device 10. The first radio network node fails in receiving a response to the paging indication. Thus, when the first radio network node 12 cannot locate the wireless device 10, i.e. if the wireless device 10 does not access and reply to the first radio network node 12 after the first radio network node 12 has sent paging indications in corresponding paging frames for a period of time, the first radio network node 12 may need to notify the core network node 13 that the first radio network node 12 was unable to locate the wireless device 10.

Action 1102. The first radio network node 12 determines that the paging is not received at the wireless device within the first service area of the first radio network node 12, and transmits an initiating indication to the core network node 13. The initiating indication, e.g. a request or a paging request, indicates an initiation of paging from the core network node 13. The first radio network node 12 may further inform the core network node 13 of presently used paging parameters, e.g. an index identity information of the wireless device 10, an identity of the wireless device 10 and/or an DRX cycle for the wireless device 10 associated with the radio network node 12.

Action 1103. The core network node 13 may determine one or more paging parameters for the wireless device 10. E.g. the core network node 13 may determine the one or more paging parameters based on received RAN information from the first radio network node such as identity of the wireless device associated to the first radio network node 12, e.g. an index identity information of the wireless device 10 defining the paging occasion in the first service area 11 used, and DRX cycle length associated to the first radio network node 12 also referred to as just DRX cycle. The core network node 13 may furthermore determine the one or more paging parameters based on stored CN information such as identity of the wireless device associated to the core network node 13 and DRX cycle length associated to the core network node 13. Thus, the core network node 13 may determine paging parameters for a paging of a wireless device in a dormant mode, and may determine paging parameters for a paging of the wireless device in an idle mode. Some of information provided by the first radio network node 12 to the core network node 13 or from the core network node 13 to the first radio network node 12 may be optional. In these cases, default parameters may be needed. These default parameters may be the ones stored at the receiving entity. In other words, in case the first radio network node 12 does not provide to the core network node 13 a RAN wireless device identity, the core network node 13 could use as a default the CN wireless device identity. Similarly, if the first radio network node 12 does not provide to the core network node 13 the RAN paging/DRX cycle, the core network node 13 could use as a default CN paging/DRX cycle. Alternatively, if the core network node 13 had previously stored the RAN wireless device identity or the RAN paging/DRX cycle for that particular wireless device 10, the core network node 13 may still use those values, unless otherwise indicated. Thus, when the first radio network node 12 escalates the paging of the wireless device to the core network node 13, the core network node 13 will initiate paging procedures in other radio network nodes e.g. the second radio network node 14.

Action 1104. The core network node 13 may transmit these determined paging parameters to one or more radio network nodes, e.g. the second radio network node 14. The core network node 13 may transmit a paging request to the second radio network node 14 informing the second radio network node 14 of paging parameters of a radio access network paging indicating PO and/or identity of the wireless device 10 in the RAN e.g. as associated at the first radio network node. The core network node 13 may further, indicated by the dashed arrow, transmit these determined further paging parameters to e.g. the second radio network node 14, informing the second radio network node 14 of paging parameters of a core network paging indicating PO and/or identity of the wireless device 10 in the CN.

Action 1105. The second radio network node 14 then uses the received paging parameters to perform the paging. E.g. the second radio network node may transmit two paging messages; one paging message in a PO based on identity of the wireless device in the first radio network node 12 and a second paging message in a PO based on identity of the wireless device in the CN. Thus, the core network node 13 may send one or more of the following two types of page messages to the second radio network node 14: one based on RAN wireless device identity index value and/or RAN paging/DRX cycle, and another page message based on CN wireless device identity index value based on IMSI and/or the CN paging/DRX cycle. The receiving second radio network node 14 may transmit one or both messages over the air interface to reach the wireless device 10.

The wireless device 10 will then either respond to the RAN wireless device identity index based paging if the wireless device 10 is in Dormant mode or the CN IMSI based paging in if the wireless device 10 is in Idle mode.

Embodiments herein may also e.g. be useful when a RAN's paging area is smaller than the wireless device's mobility area, i.e. the area which the wireless device can move within without updating the network, in a Dormant mode.

For the core network node 13 to be able to reach the wireless device 10 regardless if the wireless device 10 is in RRC dormant mode or RRC Idle mode, the first radio network node 12 may provide the core network node 13 with a wireless device Identity Index value, calculated at the first radio network node 12, that reflects a Page cycle and Page Occasions when requesting aid with the paging. The core network node 13 will then be able to send a S1-AP page message based on the wireless device Identity Index value and also to send another S1-AP page message based on that when a wireless device is paged and reach the wireless device 10 in any connected/non-connected mode, i.e. regardless if the wireless device 10 is in RRC connected mode, dormant mode or RRC idle mode.

Embodiments herein maximizes a time the wireless device 10 can be in idle mode or dormant mode and at the same time allow that paging may be done locally by a radio network node, such as first radio network node 12, or by the core network node 13. This maximizes the battery lifetime for the wireless device 10 while in Dormant and Idle mode.

Minimizing energy consumption in the radio network by using the periods of time in which the second radio network node 14 is active by different purposes, e.g. to send paging indications and messages from the second radio network node 14 and also paging indications and messages from the core network node 13.

The first radio network node 12 can change DRX cycle in dormant mode for RAN reasons only such as the first radio network node 12 identifies that the wireless device 10 does not receive data for a very long time e.g. a set time interval; the first radio network node 12 may then increase the DRX cycle to longer sleeping periods, or the other way round, and the wireless device 10 and the core network node 13 may still keep a same cycle and PO e.g. same as DRX cycle and PO in Idle Mode.

The core network node 13 may change DRX cycle for Idle mode for CN reasons, and the first radio network node 12 and the wireless device 10 may still keep a same cycle and PO, e.g. same as DRX cycle and PO in dormant mode.

There is reduced risk for losing the wireless device 10 since the wireless device 10 is reachable regardless of which radio network node the page is sent from and regardless which mode/state the wireless device actually have at the moment, and assuming RRC connected mode-active mode is short and the wireless device 10 falls back to dormant or idle mode.

Furthermore, the wireless device 10 may respond to a page from the core network node 13 earlier if the page is received in a dormant PO before an idle_mode PO occurs.

Figure 12:
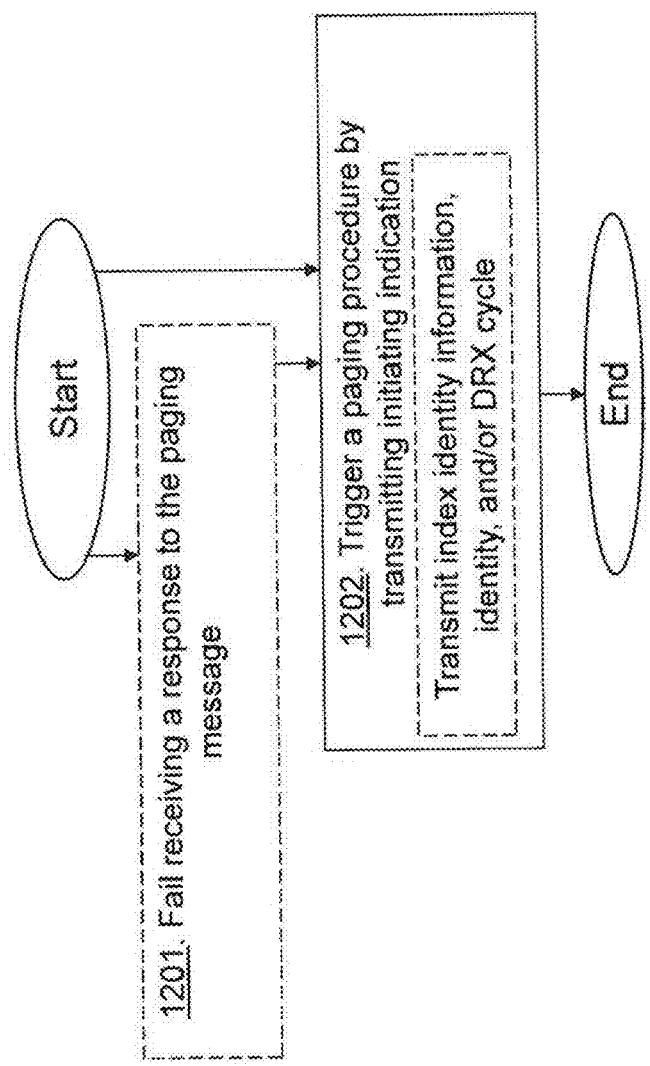
FIG. 12 is a schematic flowchart depicting a method performed by a first radio network node according to embodiments herein.

The method actions performed by the radio network node, exemplified herein as the first radio network node 12, for handling communication of data to the wireless device 10 in the wireless communication network 1 according to some embodiments will now be described with reference to a flowchart depicted in FIG. 12. The actions do not have to be taken in the order stated below, but may be taken in any suitable order. Actions performed in some embodiments are marked with dashed boxes.

Action 1201. The first radio network node 12 may fail receiving from the wireless device 10 a response to a paging message for the wireless device 10, then the first radio network node may perform action 1202.

Action 1202. The first radio network node 12 triggers the paging procedure of the wireless device 10 from the core network node 13 in the wireless communication network 1 by transmitting, to the core network node 13, the initiating indication indicating the initiation of paging from the core network node 13 when a criterion is fulfilled. E.g. the criterion may be fulfilled when the first radio network node 12 has critical information to send to the wireless device 10, or the criterion is fulfilled when the wireless device 10 omits responding to the paging message from the first radio network node 12, see action 1201. The first radio network node 12 may e.g. transmit an index identity information of the wireless device 10, also referred to as wireless device identity index value, an identity of the wireless device 10 and/or a DRX cycle for the wireless device 10. The index identity information of the wireless device 10, the identity of the wireless device 10 and/or the DRX cycle for the wireless device 10 are associated with the first radio network node 12, e.g. the identity is a latest identity as allocated by the first radio network node 12.

Figure 13:
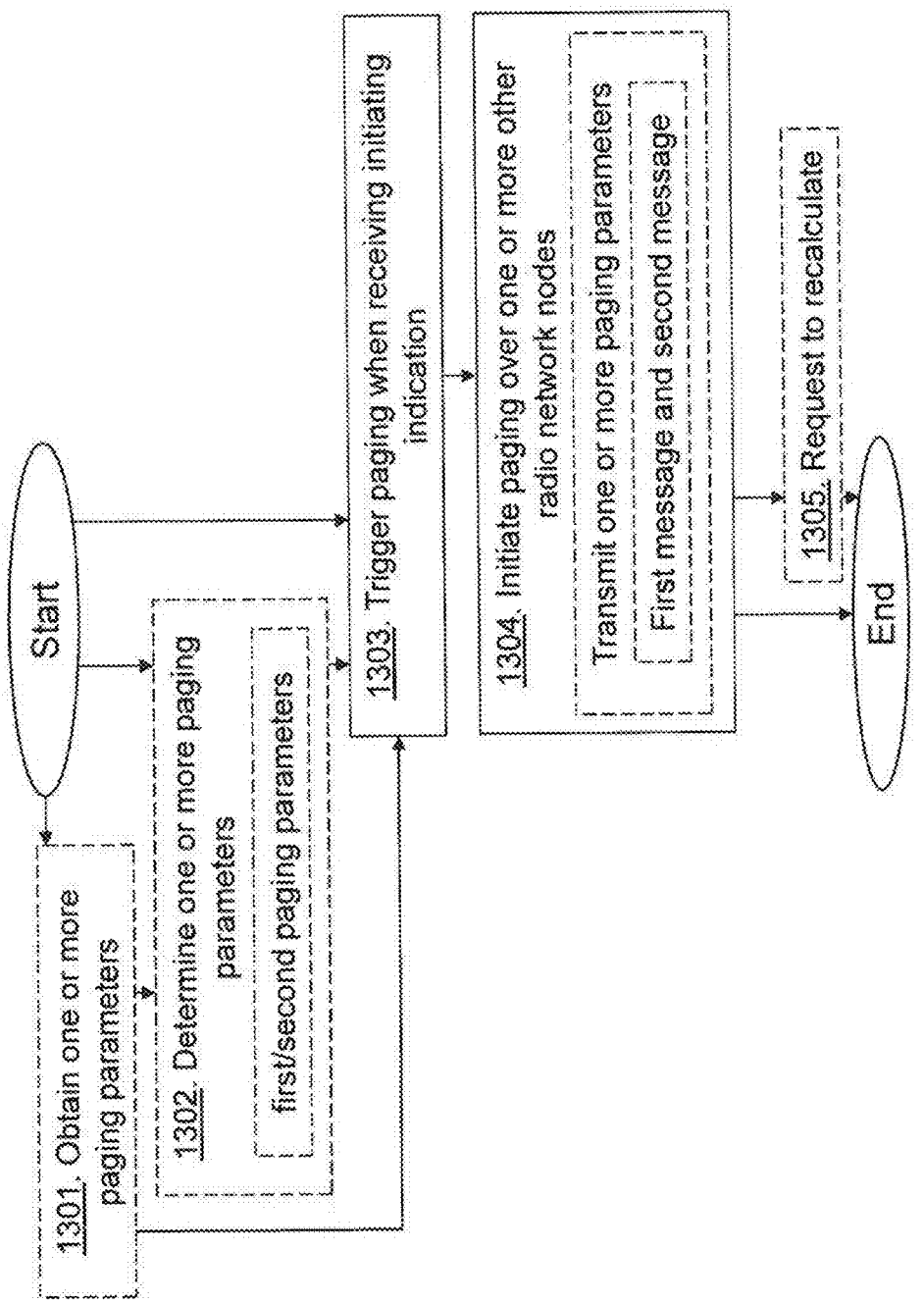
FIG. 13 is a schematic flowchart depicting a method performed by a core network node according to embodiments herein.

The method actions performed by the core network node, e.g. a MME, for handling communication of data to the wireless device 10 in the wireless communication network 1 according to some embodiments will now be described with reference to a flowchart depicted in FIG. 13. The actions do not have to be taken in the order stated below, but may be taken in any suitable order. Actions performed in some embodiments are marked with dashed boxes.

Action 1301. The core network node 13 may obtain the one or more paging parameters comprising one or more of the following, an index identity information of the wireless device, identity of the wireless device and/or one or more lengths of the DRX cycles. The one or more paging parameters may be associated with the first radio network node 12, e.g. when receiving the one or more paging parameters from the first radio network node or the wireless device 10. The core network node 13 may alternatively or additionally obtain the one or more paging parameters internally as previously stored paging parameters or default paging parameters.

Action 1302. The core network node 13 may determine the one or more paging parameters for the wireless device 10. The one or more paging parameters comprises one or more of the following: a DRX cycle, an index identity information of the wireless device 10 used by the wireless device 10 in a first service area 11 served by the first radio network node 12, and an identity of the wireless device 10. The one or more paging parameters may be associated with the core network node 13, e.g. when calculated and stored at the core network node 13 for paging wireless devices in idle_mode. The core network node 13 may e.g. determine which one or more paging parameters for the wireless device 10 to use, e.g. paging the wireless device 10 as an idle_mode paging or perform a paging for the wireless device 10 based on the configuration in the first service area 11, or both. The core network node 13 may determine one or more first paging parameters associated with the first radio network node 12, e.g. used for wireless device in dormant mode, and one or more second paging parameters associated with the core network node 13, used for wireless devices in idle mode.

Action 1303. The core network node 13 triggers the paging of the wireless device in the wireless communication network 1 when receiving, from the first radio network node 12, the initiating indication indicating the initiation of the paging from the core network node 13 for the wireless device 10.

Action 1304. The core network node 13 initiates the paging of the wireless device 10 over one or more other radio network nodes, e.g. the second radio network node 12. E.g. the core network node 13 may initiate the paging of the wireless device 10 be transmitting the determined one or more paging parameters to the one or more other radio network nodes. In some embodiments when the core network node 13 determines one or more first paging parameters associated with the first radio network node 12 and one or more second paging parameters associated with the core network node 13; the core network node 13 initiates the paging of the wireless device 10 by transmitting the one or more first paging parameters in a first message and the one or more second paging parameters in a second message. If the core network node 13 skips parts of the paging parameters to be provided to e.g. the second radio network node 14, the second radio network node 14 may use locally stored configuration(s) or paging parameters. This could be a previously stored value, or the value generated at the core network node 13.

Action 1305. The core network node 13 may request the one or more other radio network nodes, such as the second radio network node 14, to recalculate a paging occasion for the wireless device 10, thus altering a time slot, defined by the index identity information for wireless device 10, for paging the wireless device 10.

Figure 14:
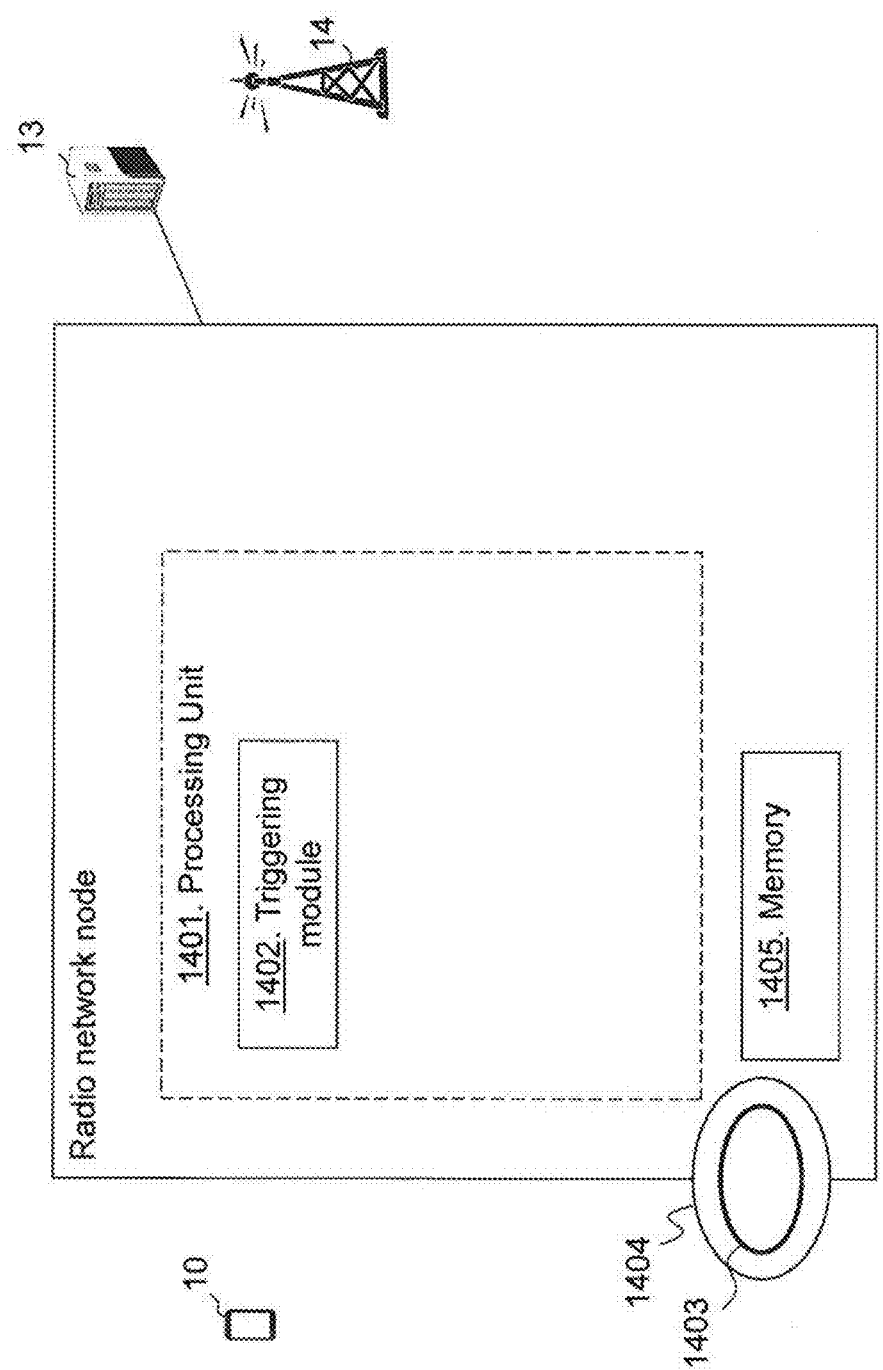
FIG. 14 is a block diagram depicting a first radio network node according to embodiments herein.

FIG. 14 is a block diagram depicting a radio network node, referred to herein as the first radio network node 12, for handling communication of data to the wireless device 10 in the wireless communication network 1.

The radio network node comprises a processing unit 1401, e.g. one or more processors, configured to perform the methods herein.

The radio network node may comprise a triggering module 1402. The radio network node, the processing unit 1401 and/or the triggering module 1402 may be configured to trigger the paging procedure of the wireless device 10 from the core network node 13 in the wireless communication network 1 by being configured to transmit, to the core network node 13, an initiating indication indicating an initiation of paging from the core network node 13 when a criterion is fulfilled. The criterion may be fulfilled when the radio network node has critical information to send to the wireless device 10, or the criterion is fulfilled when the wireless device 10 omits responding to a paging message from the radio network node. The radio network node, the processing unit 1401 and/or the triggering module 1402 may be configured to trigger the paging procedure when failing receiving, from the wireless device 10, a response to the paging message for the wireless device 10. The radio network node, the processing unit 1401 and/or the triggering module 1402 may be configured to trigger the paging procedure by being configured to transmit an index identity information of the wireless device 10, an identity of the wireless device 10 and/or a DRX cycle for the wireless device 10. The index identity information of the wireless device 10, the identity of the wireless device 10 and/or the DRX cycle for the wireless device 10 may be associated with the radio network node, e.g. the DRX cycle settings and PO of the first radio network node 12 may be informed to the core network node 13.

The methods according to the embodiments described herein for e.g. the first radio network node 12 are respectively implemented by means of e.g. a computer program 1403 or a computer program product, comprising instructions, i.e., software code portions, which, when executed on at least one processor, cause the at least one processor to carry out the actions described herein, as performed by the first radio network node 12. The computer program 1403 may be stored on a computer-readable storage medium 1404, e.g. a disc or similar. The computer-readable storage medium 1405, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

The radio network node further comprises a memory 1405. The memory comprises one or more units to be used to store data on, such as DRX cycles, index identity information, identities, paging information, data for services, applications to perform the methods disclosed herein when being executed, and similar.

Figure 15:
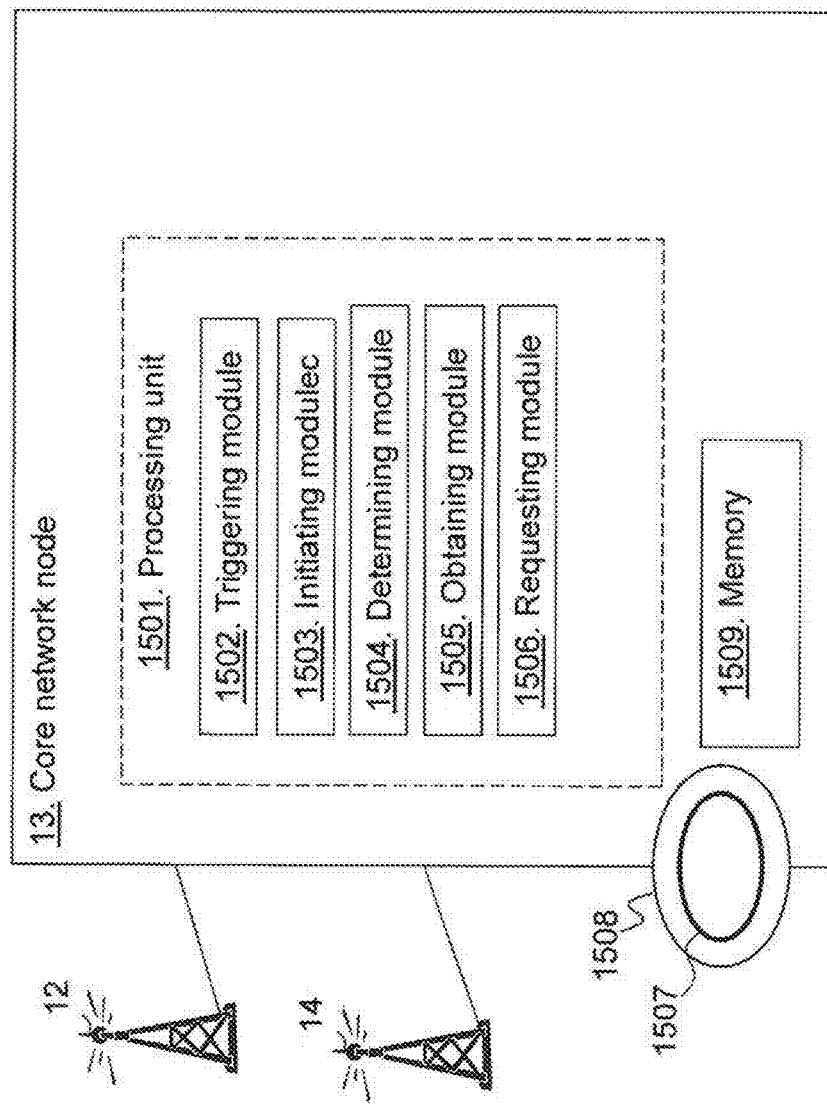
FIG. 15 is a block diagram depicting a core network node according to embodiments herein.

FIG. 15 is a block diagram depicting the core network node 13 for handling communication of data to the wireless device 10 in the wireless communication network 1.

The core network node 13 comprises a processing unit 1501, e.g. one or more processors, configured to perform the methods herein.

The core network node 13 may comprise a triggering module 1502. The core network node 13, the processing unit 1501 and/or the triggering module 1502 may be configured to trigger paging of the wireless device 10 in the wireless communication network 1 when receiving, from the first radio network node 12, the initiating indication indicating the initiation of the paging from the core network node 13 for the wireless device 10.

The core network node 13 may comprise an initiating module 1503. The core network node 13, the processing unit 1501 and/or the initiating module 1503 may be configured to initiate the paging of the wireless device 10 over one or more other radio network nodes.

The core network node 13 may comprise a determining module 1504. The core network node 13, the processing unit 1501 and/or the determining module 1504 may be configured to determine one or more paging parameters for the wireless device 10. The core network node 13, the processing unit 1501 and/or the initiating module 1503 may be configured to initiate the paging of the wireless device 10 by being configured to transmit the determined one or more paging parameters to the one or more other radio network nodes. The one or more paging parameters may comprise one or more of the following: a DRX cycle, an index identity information of the wireless device 10 used by the wireless device 10 in the first cell 11 served by the first radio network node 12, and an identity of the wireless device 10. The one or more paging parameters may be associated with the first radio network node 12 and/or the core network node 13.

The core network node 13, the processing unit 1501 and/or the determining module 1504 may be configured to determine the one or more paging parameters by being configured to determine one or more first paging parameters associated with the radio network node 12, e.g. for dormant mode, and one or more second paging parameters associated with the core network node 13 e.g. for idle mode. The core network node 13, the processing unit 1501 and/or the initiating module 1503 may be configured to initiate the paging of the wireless device 10 by being configured to transmit the one or more first paging parameters in a first message and the one or more second paging parameters in a second message e.g. to the second radio network node 14.

The core network node 13 may comprise an obtaining module 1505. The core network node 13, the processing unit 1501 and/or the obtaining module 1505 may be configured to obtain the one or more paging parameters comprising one or more of the following, an index identity information of the wireless device, identity of the wireless device and/or one or more lengths of the DRX cycles.

The core network node 13 may comprise a requesting module 1506. The core network node 13, the processing unit 1501 and/or the requesting module 1506 may be configured to request the one or more other radio network nodes to recalculate a paging occasion for the wireless device.

The methods according to the embodiments described herein for the core network node 13 are respectively implemented by means of e.g. a computer program 1507 or a computer program product, comprising instructions, i.e., software code portions, which, when executed on at least one processor, cause the at least one processor to carry out the actions described herein, as performed by the core network node 13. The computer program 1507 may be stored on a computer-readable storage medium 1508, e.g. a disc or similar. The computer-readable storage medium 1508, having stored thereon the computer program, may comprise the instructions which, when executed on at least one processor, cause the at least one processor to carry out the actions described herein, as performed by the core network node 13. In some embodiments, the computer-readable storage medium may be a non-transitory computer-readable storage medium.

The core network node 13 further comprises a memory 1509. The memory comprises one or more units to be used to store data on, such as DRX cycles, index identity information, identities, paging information, data for services, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them.

Several of the functions may be implemented on a processor shared with other functional components of a radio/core network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of core/radio network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a radio network node for handling communication of data to a wireless device in a wireless communication network, the method comprising:
   triggering a paging procedure of the wireless device from a core network node in the wireless communication network by transmitting a message, based on a determination that a response to a paging message sent by the radio network node is not received from the wireless device; and
   transmitting, to the core network node, an indication to initiate paging from the core network node according to second Discontinuous Reception (DRX) cycle if the radio network node failed receiving a paging response,
   wherein the message comprises one or more paging parameters associated with the radio network node used for paging the wireless device according to a first DRX cycle for the wireless device associated with the radio network node,
   wherein triggering the paging procedure is further based on a determination that the radio network node has critical information to send to the wireless device.

2. The method according to claim 1, wherein the transmitting of the message further comprises transmitting one or more of index identity information of the wireless device, and an identity of the wireless device.

3. The method according to claim 2, wherein the one or more of the index identity information of the wireless device, the identity of the wireless device, and the DRX cycle information for the wireless device are associated with the radio network node.

4. A method performed by a core network node for handling communication of data to a wireless device in a wireless communication network, the method comprising:
   receiving, from a radio network node, an indication to initiate paging of the wireless device based on a first Discontinuous Reception (DRX) cycle for the wireless device associated with radio network node, obtained from the radio network node;
   determining a second Discontinuous Reception (DRX) cycle for the wireless device associated with the core network node, based on the first DRX cycle,
   wherein the first and second DRX cycle is different; and
   initiating the paging of the wireless device according to said the second DRX cycle;
   triggering a paging procedure of the wireless device from the core network node in the wireless communication network by transmitting a message to the core network node, indicating initiation of paging from the core network node according to said second DRX cycle if the radio network node failed receiving a paging response, and wherein a message comprises one or more paging parameters associated with the radio network node used for paging the wireless device according to the first DRX cycle.

5. The method according to claim 4, further comprising transmitting the determined second DRX cycle to one or more other radio network nodes.

6. The method according to claim 5, wherein the one or more paging parameters comprises one or more of second DRX cycle information, index identity information of the wireless device used by the wireless device in a first service area served by the radio network node, and an identity of the wireless device.

7. The method according to claim 5, wherein the one or more paging parameters comprises one or more of index identity information of the wireless device, identity of the wireless device, and one or more lengths of the first DRX cycles for the wireless device.

8. The method according to claim 5, transmitting the second DRX cycle comprises transmitting the first DRX cycle information in a first message and transmitting at least a portion the second DRX cycle information in a second message.

9. The method according to claim 4, further comprising:
   requesting the one or more other radio network nodes to recalculate a paging occasion for the wireless device.

10. A radio network node configured to handle communication of data to a wireless device in a wireless communication network, the radio network node comprising processing circuitry configured to:
   trigger a paging procedure of the wireless device from a core network node in the wireless communication network by transmitting a message, based on a determination that response to a paging message sent by the radio network node is not received from the wireless device; and
   transmit, to the core network node, an indication to initiate paging from the core network node according to second Discontinuous Reception (DRX) cycle if the radio network node failed receiving a paging response,
   wherein the message comprises one or more paging parameters associated with the radio network node used for paging the wireless device according to a first DRX cycle for the wireless device associated with the radio network node,
   wherein triggering the paging procedure is further based on a determination that the radio network node has critical information to send to the wireless device.

11. The radio network node according to claim 10, wherein the processing circuitry is configured to transmit one or more of index identity information of the wireless device, an identity of the wireless device, and the second DRX cycle information for the wireless device.

12. The radio network node according to claim 11, wherein the one or more of the index identity information of the wireless device, the identity of the wireless device, and the first DRX cycle information for the wireless device are associated with the radio network node.

13. A core network node configured to handle communication of data to a wireless device in a wireless communication network, the core network node comprising processing circuitry configured to:
  receive, from a radio network node, an indication to initiate paging of the wireless device based on a first Discontinuous Reception (DRX) cycle for the wireless device associated with radio network node, obtained from the radio network node;
  determine a second Discontinuous Reception (DRX) cycle for the wireless device associated with the core network node, for the wireless device based on the first DRX cycle
    wherein the first and second DRX cycle is different; and
  initiate the paging of the wireless device according to said the second DRX cycle;
  trigger a paging procedure of the wireless device from the core network node in the wireless communication network by transmitting a message to the core network node, indicating initiation of paging from the core network node according to said second DRX cycle if the radio network node failed receiving a paging response, and wherein a message comprises one or more paging parameters associated with the radio network node used for paging the wireless device according to the first DRX cycle.

14. The core network node according to claim 13, wherein the processing circuitry is configured to:
  transmit the second DRX cycle to the one or more other radio network nodes.

15. The core network node according to claim 14, wherein the paging parameters comprises one or more of second DRX cycle information, index identity information of the wireless device used by the wireless device in a first cell served by the radio network node, and an identity of the wireless device.

16. The core network node according to claim 14, wherein paging parameters comprising one or more of index identity information of the wireless device, an identity of the wireless device, and one or more lengths of first DRX cycles for the wireless device.

17. The core network node according to claim 14, wherein the processing circuitry is configured to transmit the first DRX cycle in a first message and transmit at least a portion of the second DRX cycle in a second message.

18. The core network node according to claim 13, wherein the processing circuitry is configured to request the one or more other radio network nodes to recalculate a paging occasion for the wireless device.

19. A non-transitory computer-readable storage medium storing a computer program comprising instructions that, when executed on at least one processor of a radio network node in a wireless communication network, cause the radio network node to:
  trigger a paging procedure of the wireless device from a core network node in the wireless communication network by transmitting a message, based on a determination that a response to a paging message sent by the radio network node is not received from the wireless device; and
  transmit, to the core network node, an indication to initiate paging from the core network node according to second Discontinuous Reception (DRX) cycle if the radio network node failed receiving a paging response,
  wherein the message comprises one or more paging parameters associated with the radio network node used for paging the wireless device according to a first DRX cycle for the wireless device associated with the radio network node.

20. A non-transitory computer-readable storage medium storing a computer program comprising instructions that, when executed on at least one processor of a core network node in a wireless communication network, cause the core network node to:
  receive, from a radio network node, an indication to initiate paging of the wireless device based on a first Discontinuous Reception (DRX) cycle for the wireless device associated with radio network node, obtained from the network node;
  determine a second Discontinuous Reception (DRX) cycle for the wireless device associated with the core network node, based on the first DRX cycle,
    wherein the first and second DRX cycle is different; and
  initiate the paging of the wireless device according to said the second DRX cycle;
  triggering a paging procedure of the wireless device from the core network node in the wireless communication network by transmitting a message to the core network node, indicating initiation of paging from the core network node according to said second DRX cycle if the radio network node failed receiving a paging response, and wherein a message comprises one or more paging parameters associated with the radio network node used for paging the wireless device according to the first DRX cycle.

* * * * *